(12) United States Patent
MacLean et al.

(10) Patent No.: US 8,107,476 B2
(45) Date of Patent: *Jan. 31, 2012

(54) SYSTEM AND METHOD FOR SWITCHING PACKET TRAFFIC OVER AN OPTICAL TRANSPORT NETWORK

(75) Inventors: Mark D. MacLean, Nepean (CA); Stephen C. Lewis, Kanata (CA)

(73) Assignee: Ciena Corporation, Linthicum, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/753,162

(22) Filed: Apr. 2, 2010

(65) Prior Publication Data

US 2010/0189435 A1     Jul. 29, 2010

Related U.S. Application Data

(63) Continuation of application No. 10/681,873, filed on Oct. 8, 2003, now Pat. No. 7,787,460.

(51) Int. Cl.
*H04L 12/28* (2006.01)
*H04L 12/56* (2006.01)
(52) U.S. Cl. ......... 370/392; 370/466; 370/467; 370/475
(58) Field of Classification Search .................. 370/392, 370/466, 467, 475
See application file for complete search history.

(56) References Cited

U.S. PATENT DOCUMENTS

| | | | |
|---|---|---|---|
| 6,993,046 B1* | 1/2006 | Hernandez-Valencia et al. | 370/470 |
| 7,035,294 B2* | 4/2006 | Dove et al. | 370/535 |
| 7,072,360 B2* | 7/2006 | Dravida et al. | 370/468 |
| 2003/0081287 A1* | 5/2003 | Jannson et al. | 359/139 |

* cited by examiner

*Primary Examiner* — Quynh Nguyen
(74) *Attorney, Agent, or Firm* — Christopher & Weisberg, P.A.

(57) ABSTRACT

A system and method for switching packet traffic over an optical transport network comprises a network element having first and second mappers for mapping packet traffic to electrical streams. A network interface includes a packet switch that directs a first packet stream to the first mapper based on a destination of the packets in the first packet stream and a second packet stream to the second mapper based on a destination of the packets in the second packet stream. The first mapper produces a first stream of electrical signals from the first packet stream, and the second mapper produces a second stream of electrical signals from the second packet stream. Each electrical signal stream is allocated a portion of bandwidth of an optical interface. The optical interface produces an optical signal that includes the first and second electrical signal streams according to the bandwidth allocated to each electrical signal stream.

30 Claims, 4 Drawing Sheets

SYSTEM AND METHOD FOR SWITCHING PACKET TRAFFIC OVER AN OPTICAL TRANSPORT NETWORK

RELATED APPLICATION

This application is a continuation application claiming the benefit of U.S. patent application Ser. No. 10/681,873, filed Oct. 8, 2003, titled "System and Method for Switching Packet Traffic over an Optical Transport Network", the entirety of which is incorporated by reference herein.

FIELD OF THE INVENTION

The invention relates generally to optical telecommunications systems. More particularly, the invention relates to a system and method for switching packet traffic over an optical transport network.

BACKGROUND

Internet Protocol (IP) networks of today use switches and routers to forward packets to optical networks for transport. Currently, IP networks permit the generation of point-to-point links between routers over an optical network. Each point-to-point link passing through the optical network logically connects two optical network elements: one network element is where packet traffic enters the optical network and the other network element is where the packet traffic leaves the optical network. Because routing and switching usually occur outside of the optical network, each network element requires a physical interface to the IP network for each point-to-point link. For a network element participating in a plurality of point-to-point links, such as a hub, the number of physical interfaces needed by the network element adds to its expense and complexity.

Moreover, having multiple physical interfaces is potentially wasteful of bandwidth. For example, if a physical interface supports a Gigabit Ethernet service, and such traffic, being bursty in general, does not utilize the available bandwidth of the physical interface, not only is the bandwidth underutilized by the Gigabit Ethernet service, but also the unused bandwidth is unavailable to other services. This inefficiency exacerbates when there are multiple underutilized physical interfaces. There is, therefore, a need for a system and method that can switch or route IP traffic over an optical network without the inefficiencies of current implementations.

SUMMARY

In one aspect, the invention features a network element comprising a plurality of mappers for mapping packet traffic to electrical streams. The plurality of mappers includes a first mapper and a second mapper. A network interface, for receiving packets from a packet-switched network, includes a packet switch that directs a first stream of packets to the first mapper based on a destination of the packets in the first packet stream and a second stream of packets to the second mapper based on a destination of the packets in the second packet stream. The first mapper produces a first stream of electrical signals from the first packet stream, and the second mapper produces a second stream of electrical signals from the second packet stream. An optical interface operates at a bandwidth for transmitting optical signals onto an optical transport network. Each of the first and second streams of electrical signals is allocated a portion of the bandwidth of the optical interface. The optical interface produces an optical signal that includes the first and second streams of electrical signals in accordance with the bandwidth allocated to each of the first and second streams of electrical signals.

In another aspect, the invention features an optical transport network comprising a network element including a network interface that receives packets from a packet-switched network, a plurality of mappers, and an optical interface. The network interface has a packet switch that switches each packet of received packet traffic to one mapper of the plurality of mappers selected based on a destination of that packet. Each mapper maps packets received from the packet switch into a separate stream of electrical signals targeted to the destination associated with that mapper. The optical interface operates at a bandwidth for transmitting optical signals over the optical transport network. Each separate stream of electrical signals is allocated a portion of the bandwidth of the optical interface. The optical interface produces an optical signal that aggregates the separate streams of electrical signals in accordance with the bandwidth allocated to each separate stream of electrical signals.

In another aspect, the invention features a method of switching packet traffic over an optical transport network. Packet traffic is received from a packet-switched network at a network element having a first mapper and a second mapper for mapping packet traffic into separate streams of electrical signals. A first stream of packets is switched to the first mapper based on a destination of the packets in the first packet stream and a second stream of packets is switched to a second traffic mapper based on a destination of the packets in the second packet stream. The first mapper produces a first separate stream of electrical signals from the first packet stream, and the second mapper produces a second separate stream of electrical signals from the second packet stream. Bandwidth of an optical interface is allocated to each of the first and second streams of electrical signals. An optical signal is produced that includes the first and second streams of electrical signals in accordance with the bandwidth allocated to each of the first and second streams of electrical signals.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, an optical network element constructed in accordance with the invention integrates routing (or switching) with Time Division Multiplexing (TDM) and optical transport. Through a single physical interface connected to a packet-switched network (e.g., an Internet Protocol (IP)

network), the optical network element receives and maps packet traffic to STS signals. Having routing (layer 3) or switching (layer 2) capability, the network element selects an internal path by which to map packets to STS signals. Each internal path produces STS signals for transport to a particular destination in the optical transport network. Thus, the network element, in effect, routes packets received through the single interface to one of a plurality of network elements connected to the transport network. As a result of this routing or switching capability of the network element, the optical transport network takes on a characteristic of a packet-switched network. That is, the packet-switched network, from which packet traffic is received, and the optical transport network appear and operate like a single virtual packet switch.

Also, the invention exploits virtual concatenation (VCAT) technology to produce appropriately sized pipes for mapping packet traffic, such as Gigabit Ethernet, to the optical transport and Link Capacity Adjustment Schemes (LCAS) technology to incrementally add and remove bandwidth capability from traffic streams, as described further below. Although the description of the invention refers primarily to Gigabit Ethernet services, the invention applies also to other types of packet traffic including, but not limited to, Fiber Channel, Fast Ethernet, and video streaming applications, provided the traffic is mapped to the optical transport using a mapping technology such as Generic Framing Procedure or GFP.

Figure 1:
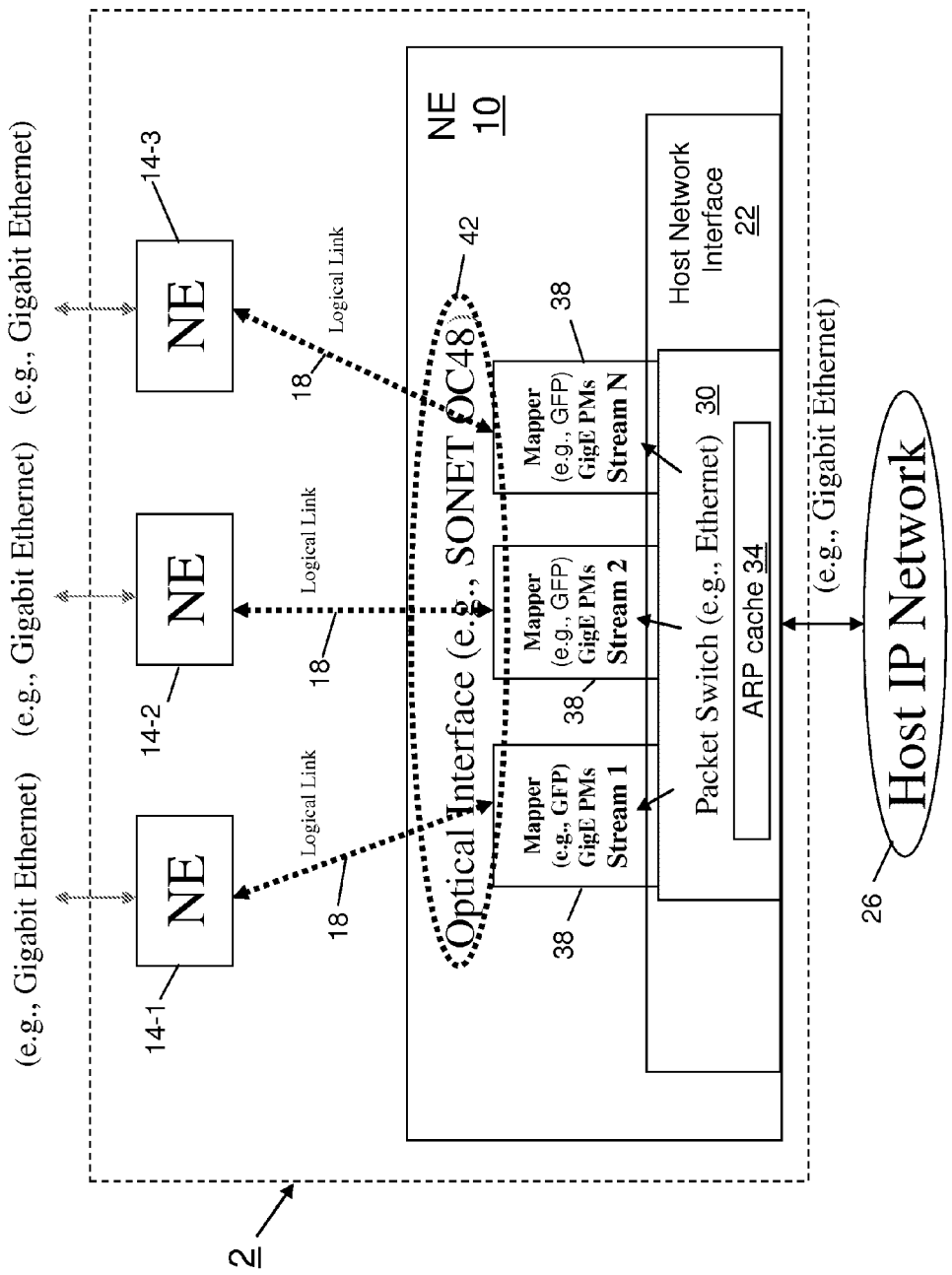
FIG. 1 is a block diagram of an embodiment of an optical network constructed in accordance with the principles of the invention.

FIG. 1 shows an embodiment of an optical transport network 2 including an optical network element (NE) 10 constructed in accordance with the principles of the invention. The optical transport network 2 also includes a plurality of network elements 14-1, 14-2, and 14-3 (generally, NE 14) in communication with the NE 10 over logical links 18 and with one or more IP networks. A logical link, as used herein, represents a communication path having zero, one, or more than one network element in the path between the endpoints of the logical link. The invention can be practiced in other network topologies, such as linear point-to-point, linear add/drop multiplexer (ADM), and mesh networks. In one embodiment, the optical transport network 2 transports optical signals according to the SONET standard. Although described herein with respect to SONET, the invention can be implemented over other transport layers (e.g., SDH and Optical Transport Network (OTN)).

The NE 10 includes a host network interface 22 in communication with a host IP network 26 from which the NE 10 receives packet traffic. In general, the host IP network 26 is a packet-switched network comprised of switches and routers for routing packet traffic (e.g., Gigabit Ethernet). An example of a packet-switched network is the Internet. The host IP network 26 can be an Ethernet local area network (LAN) or a wide area network (WAN).

The host network interface 22 includes a packet switch 30 for processing the packet traffic from the host IP network 26 and switching (or routing) the traffic to a particular destination on the transport network 2 in accordance with the invention. An advantage of the present invention stemming from the integration of a packet switch with the optical transport is that a single physical interface only, here, host network interface 22, is needed to exchange packet traffic with the host network 26. Packet traffic from different services traveling to different destinations pass through this one host network interface 22, thus providing an efficiency lacking in optical network elements requiring multiple physical interfaces to support different services.

In one embodiment in which media access control (MAC) addresses are used for routing packets, the packet switch 30 includes an address resolution protocol (ARP) cache 34 for storing Ethernet addresses and IP addresses of those nodes connected to the NEs 14 on the optical transport network 2. The particular ARP protocol used by the NE 10 can be standard proxy ARP or any other standard or proprietary address resolution protocol. Referring to proxy ARP as an illustrative example, when a node in the host network 26 seeks an Ethernet address, that node broadcasts an ARP packet to all nodes connected to the host network 26. The ARP packet contains the IP address of interest. When the ARP request arrives from the host network 26, the NE 10 searches its ARP cache 34 for the IP address of interest. If the IP address is present in the ARP cache 34, the NE 10 responds on behalf of the target node. Specifically, the NE 10 sends an ARP reply matching the remote IP address with the Ethernet address of the NE 10. Thus, by operating using proxy ARP, the NE 10 limits ARP traffic from passing over the optical transport network 2.

The NE 10 also includes a plurality of traffic mappers 38 and an optical interface 42 (e.g., OC-48). The mappers 38 are integrated with the packet switch 30. Preferably, the host network interface 22 with the packet switch 30, the mappers 38, and optical interface 42 are embodied on a single tributary or port card of the NE 10. Each mapper 38 is associated with one of the NEs 14 to which the network element 10 is connected by a logical link 18. Each mapper 38 produces a separate electrical stream of STS signals (or STM signals for SDH) targeted to that one NE 14. As used herein, a stream of STS signals means a group of STS-n signals that can be either contiguous or non-contiguous. The separate electrical streams can be targeted to different NEs 14, to different interfaces of the same NE 14, or to the same interface of the same NE 14. Although three mappers 38 are shown in FIG. 1, the principles of the invention extend to fewer and to greater numbers of mappers 38.

In one embodiment, each traffic mapper 38 uses Generic Framing Procedure (GFP) to map incoming signals (e.g., Ethernet) to synchronous transport signals (STS) appropriate for delivery over the optical transport network 2. Mapping, as used broadly herein, means preparing packet signals for transport over the optical transport layer. Accordingly, mapping includes the various operations for producing such signals, such as mapping packets to frames, adapting and multiplexing.

In one embodiment, each mapper 38 also utilizes the VCAT and LCAS technologies to map the traffic stream processed by that mapper 38. With the use of the VCAT technology, each mapper 38 maps, for example, Gigabit Ethernet signals to STS-1 signals and transports the STS-1 signals through the optical interface 42 in an appropriately sized pipe. In this embodiment, the STS-1 is the base unit of granularity to enable the use of the LCAS technology for incrementally added or removing bandwidth from the pipe. It is to be understood that the principles of the invention can apply to finer units of granularity than STS-1, provided there is a technology capable of incrementally adding and removing bandwidth at that finer granularity.

The optical interface 42 receives the separate stream of STS signals from each of the mappers 38 and from these STS streams produces optical signals to be transmitted over the optical transport network 2. Referring to the example in FIG. 1, the optical interface 42 receives three separate streams of GFP-mapped STS signals and time-division multiplexes the STS signals into an OC-48 SONET signal. The separate electrical streams of STS signals produced by the mappers 38 share the available bandwidth of the optical interface 42. Each separate stream of STS signals is apportioned part of the available bandwidth. With the use of the VCAT and LCAS technologies, the NE 10 is able to dynamically manage the bandwidth allocated to each of stream contending for the bandwidth of the optical interface 42. In general, when bandwidth usage of the optical interface 42 is at less than full capacity, the NE 10 allocates additional bandwidth to those STS streams satisfying certain criteria (e.g., exceeds a current utilization threshold). When bandwidth usage is at capacity, the NE 10 balances the available bandwidth among the services sharing the optical interface 42 according to priorities provisioned by a user or service provider. In general, bandwidth can be shifted from an underutilizing service to a service needing additional bandwidth. Thus, the present invention achieves an advantage of increased efficient use of the available bandwidth. This adaptive bandwidth management mechanism is described in more detail in a United States patent application titled "System and Method of Adaptively Managing Bandwidth on Optical Links Shared by Multiple Services Using Virtual Concatenation and Link Capacity Adjustment Schemes," by MacLean et al., Ser. No. 10/678, 807, filed Oct. 3, 2003, the entirety of which application is incorporated by reference herein.

Figure 2:
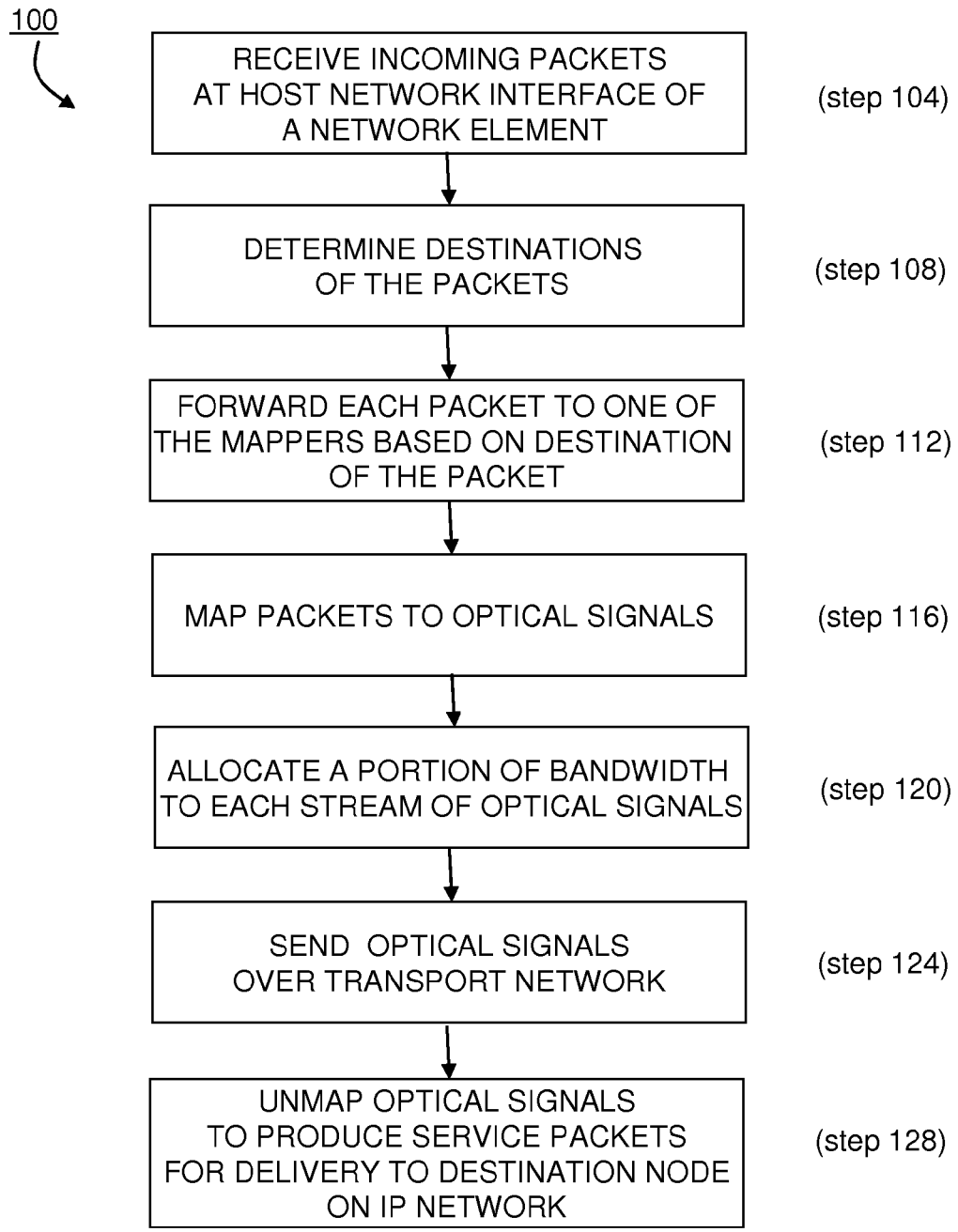
FIG. 2 is a flow diagram of an embodiment of a process for switching packet traffic over an optical transport network in accordance with the invention.

FIG. 2 shows an embodiment of a process 100 for switching packet traffic over an optical transport network. In the description of the process 100, reference is made to FIG. 1. At step 104, the host network interface 22 of the NE 10 receives an incoming stream of packets from the host IP network 26. These incoming packets can come from a variety of sources of in the host IP network 26 and have a variety of destinations. The packet switch 30 of the host network interface 22 determines (step 108) the destination of each packet from address information in the packet. Based on the destination of a given packet, the packet switch 30 forwards (step 112) the packet to one of the traffic mappers 38. In effect, the packet switch 30 is switching or routing the packet towards its destination.

The switching (or routing) functionality of the packet switch 30 can be implemented in one of a variety of mechanisms. One mechanism uses the MAC addresses of the packet traffic to determine to which mapper 38 to forward the packets. This mechanism utilizes the ARP cache 34 to determine those nodes connected to the NEs 14. Another technique is to use virtual local area network (VLAN) tags to logically separate the packet traffic. Yet another technique uses the IP addresses of the packet traffic. For example, for a first IP address range, the packet switch 30 forwards packet traffic to a first one of the mappers 38 and for a second IP address range to a second one of the mappers 38. Also, a policy can govern the use of an alternative mapper in the event the initially selected mapper cannot be used (e.g. optical link to an NE is down). Another technique uses label-switching (e.g, multi-protocol label switching or MPLS) to identify the destination of each packet. Any combination of these techniques can be used to practice the invention.

Each traffic mapper 38 receives a separate stream of packet traffic targeted to a particular destination and maps (step 116) its respective stream of packet traffic into a stream of electrical STS signals. An example of a procedure for performing the mapping is GFP. Accordingly, each packet traffic stream is processed separately. In other embodiments, each mapper 38 also performs other operations on its respective packet traffic stream, including VCAT, LCAS, and performance monitoring.

As described above, the separate electrical streams of STS signals share the bandwidth of the optical interface 42. In step 120, each separate STS stream is allocated a portion of this bandwidth. In one embodiment, this allocation is statically determined—each STS stream receives a percentage of the bandwidth. In this embodiment, the bandwidth allocated to a given STS stream remains static although potentially underutilized or adequate to support bursty or peak-load traffic. In another embodiment, the bandwidth allocated to each STS stream is dynamically determined using the VCAT, LCAS, and the adaptive bandwidth management process described above. To perform adaptive bandwidth management, each mapper 38 calculates utilization metrics used by the adaptive bandwidth management process to determine whether to allocate more or less bandwidth to its respective STS stream. Based on these metrics, one STS stream can receive additional bandwidth taken from the unused bandwidth of another STS stream to satisfy an increased flow of packets. In step 124, the optical interface 42 produces an optical signal that is an aggregation of all the STS streams in accordance with the bandwidth allocated to each STS stream and forwards the optical signal onto the transport network 2.

The destination NE 14 receiving the optical signals unmaps (step 128) the optical signals to produce corresponding packets. Through an IP network interface of that NE, 14 the packets pass to an IP network for forwarding towards their eventual destination.

Figure 3:
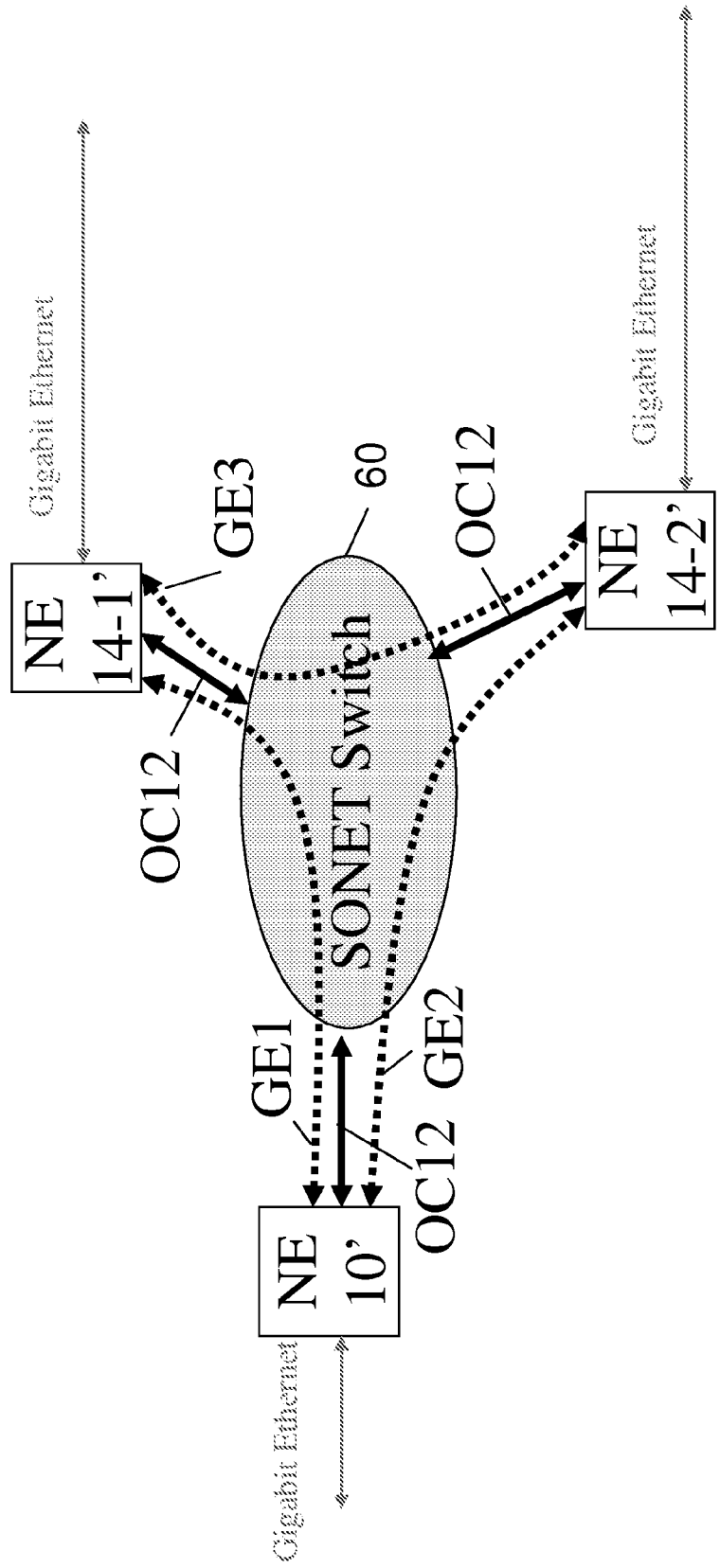
FIG. 3 is a block diagram of an embodiment of an optical network useful in the practice of the invention.

FIG. 3 shows an embodiment of an optical transport network 2' including an NE10'constructed in accordance with the invention, NEs 14-1' and 14-2' (generally NE 14'), and a SONET switch 60. As shown, each NE 10', 14-1', 14-2' has an OC-12 optical interface and maps one incoming Gigabit Ethernet traffic stream into two Gigabit Ethernet streams that share the OC-12 bandwidth. NE 10' processes streams GE1 and GE3, NE 14-1' processes streams GE1 and GE2, and the NE 14-2' processes streams GE2 and GE3. Each NE 10', 14-1', 14-2' can statically determine the bandwidth allocated to each stream sharing its respective optical link or adaptively manage the bandwidth allocations between the streams. All streams pass through the SONET switch 60, which forwards the appropriate stream to the appropriate NE.

When an NE constructed in accordance with the invention is logically connected to all other NEs in the optical transport network, as in FIG. 3, the optical transport network has a functional appearance of a distributed optical packet switch (i.e., a shared Layer 2 network or a shared Layer 3, depending upon the implementation of the packet switch). This functional appearance of a distributed optical packet switch occurs whether zero, one, or both of the NEs 14' are similarly constructed as the NE 10' (i.e., with a packet switch and traffic mappers).

Figure 4:
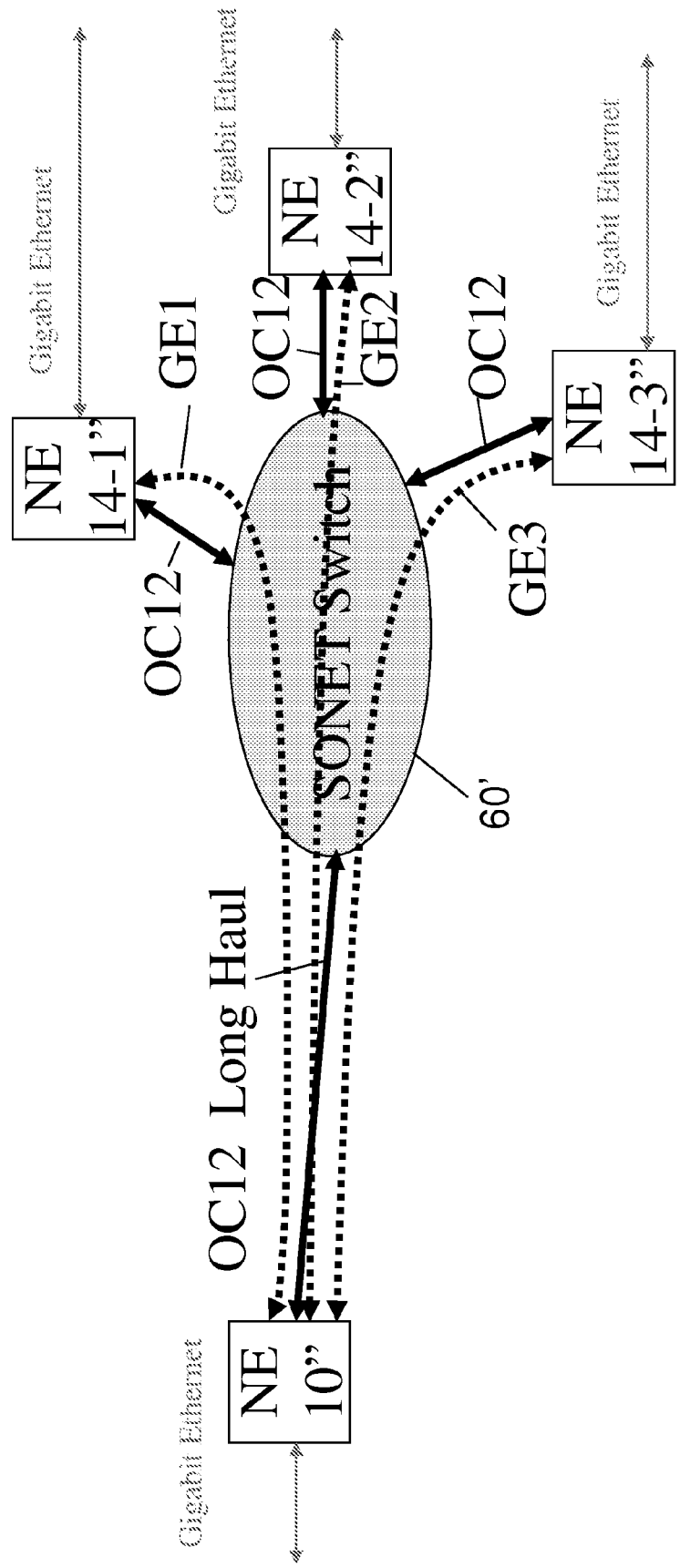
FIG. 4 is a block diagram of another embodiment of an optical network useful in the practice of the invention.

This functional appearance of a single distributed optical packet switch applies also to optical transport network in which all NEs do not have a logical link to all other NEs in the optical transport network, such as is shown in FIG. 4. In FIG. 4, an embodiment of an optical transport network 2" includes a NE 10", constructed in accordance with the invention, in communication with NE's 14-1", 14-2" and 14-3" (generally NE 14") through a SONET switch 60'. Zero, one, or more than one of the NEs 14" are similarly constructed as the NE 10'in accordance with the invention.

In this embodiment, the packet switch of the NE 10" switches a single stream of Gigabit Ethernet packet traffic into three traffic mappers that process three separate streams (GE1, GE2, GE3) of optical signals. Each NE 14-1, 14-2, and 14-3 is a targeted destination for one of the three streams. The switch 60' separates the optical signal streams and sends one stream to each of the three destinations. These three optical signal streams share the bandwidth of the long-haul link. The apportioning of the bandwidth of the long-haul link among the three optical signal streams can be statically determined or adaptively managed, as described above.

As shown, each NE 10", 14" is connected to the SONET switch 60' by an OC-12 link; the NE 10" is connected to the SONET switch 60' over a long haul OC-12 link. In this embodiment, the NEs 14 do not have logical links to each other. Although the NEs 14 do not have logical links to each other, the ability of the NE 10" to switch packets to any one of the NEs 14 in the optical transport network 2" ensures that packets (i.e., optical signals corresponding to the packets) can reach their destination.

For example, if an IP node connected to NE 14-1" sends packet traffic to a node connected to the NE 14-2", the NE 14-1" sends optical signals corresponding to the packet traffic to the NE 10". The NE 10" receives the traffic at a first one of its mappers, determines that the packet traffic destination is NE 14-2", and switches the traffic to a second one of its mappers for transporting to the NE 14-2". Thus, although NE 14-1 and NE 14-2 do not share a logical link, traffic can be exchanged between the two devices. Further, the packet traffic does not have to leave the transport optical network 2" through the host network interface of the NE 10" to reach its destination.

While the invention has been shown and described with reference to specific preferred embodiments, it should be understood by those skilled in the art that various changes in form and detail may be made therein without departing from the spirit and scope of the invention as defined by the following claims.

What is claimed is:

1. A network element, comprising:
   a plurality of mappers for mapping packet traffic to electrical streams, the plurality of mappers including a first mapper and a second mapper;
   a network interface for receiving packets from a packet-switched network, the network interface including a packet switch that directs a first stream of packets as electrical signals to the first mapper based on a destination of the packets in the first packet stream and directs a second stream of packets as electrical signals to the second mapper based on a destination of the packets in the second packet stream, the first mapper producing a first stream of electrical signals from the first packet stream, the second mapper producing a second stream of electrical signals from the second packet stream;
   an optical interface operating at a bandwidth for transmitting optical signals onto an optical transport network, each of the first and second streams of electrical signals being allocated a portion of the bandwidth of the optical interface, the optical interface producing an optical signal that includes information from each of the first and second streams of electrical signals in accordance with the bandwidth allocated to each of the first and second streams of electrical signals; and
   each mapper including at least one of Link Capacity Adjustment Schemes (LCAS) and Virtual Concatenation (VCAT) technologies for dynamically controlling the bandwidth allocated by the optical interface.

2. The network element of claim 1, wherein the packet switch includes an address resolution protocol (ARP) cache.

3. The network element of claim 1, wherein the bandwidth allocated to each of the first and second streams of electrical signals is statically determined.

4. The network element of claim 1, wherein the bandwidth allocated to each of the first and second streams of electrical signals is dynamically controlled.

5. The network element of claim 1, wherein the packet traffic is Gigabit Ethernet traffic.

6. The network element of claim 1, wherein each mapper uses a Generic Framing Procedure to map packets to a separate electrical stream.

7. The network element of claim 1, wherein the packet switch uses virtual local area network (VLAN) tags to determine to which of the mappers to forward a packet.

8. The network element of claim 1, wherein the packet switch uses multi-protocol label-switching (MPLS) to determine to which of the mappers to forward a packet.

9. The network element of claim 1, wherein the packet switch uses Internet Protocol (IP) addresses to determine to which of the mappers to forward a packet.

10. The network element of claim 1, wherein the first destination and second destination are one of a) different network elements connected to the optical transport network, b) different interfaces of the same network element connected to the optical transport network, and c) the same interface of the same network element.

11. An optical transport network comprising a network element including a network interface that receives packets from a packet-switched network, a plurality of mappers, and an optical interface, the network interface having a packet switch that switches each packet of received packet traffic as a stream of electrical signals to one mapper of the plurality of mappers selected based on a destination of that packet, each mapper mapping packets received from the packet switch into a separate stream of electrical signals targeted to the destination associated with a mapper, each mapper including at least one of Link Capacity Adjustment Schemes (LCAS) and Virtual Concatenation (VCAT) technologies for dynamically controlling the bandwidth allocated by the optical interface, the optical interface operating at a bandwidth for transmitting optical signals over the optical transport network, each separate stream of electrical signals being allocated a portion of the bandwidth of the optical interface, the optical interface producing an optical signal that aggregates the separate streams of electrical signals in accordance with the bandwidth allocated to each separate stream of electrical signals.

12. The optical transport network of claim 11, wherein the packet switch includes an address resolution protocol (ARP) cache.

13. The optical transport network of claim 11, wherein the bandwidth allocated to each of the first and second streams of electrical signals is statically determined.

14. The optical transport network of claim 11, wherein the bandwidth allocated to each of the first and second streams of electrical signals is dynamically controlled.

15. The optical transport network of claim 11, wherein the packets are Gigabit Ethernet packets.

16. The optical transport network of claim 11, wherein each mapper uses a Generic Framing Procedure to map packets to an electrical stream.

17. The optical transport network of claim 11, wherein the packet switch uses virtual local area network (VLAN) tags to determine to which of the mappers to forward a packet.

18. The optical transport network of claim 11, wherein the packet switch uses multi-protocol label-switching (MPLS) to determine to which of the mappers to forward a packet.

19. The optical transport network of claim 11, wherein the packet switch uses Internet Protocol (IP) addresses to determine to which of the mappers to forward a packet.

20. A method of switching packet traffic over an optical transport network, the method comprising:
   receiving packet traffic from a packet-switched network at a network element having a first mapper and a second mapper for mapping packet traffic into separate streams of electrical signals;

switching a first stream of packets to the first mapper based on a destination of the packets in the first packet stream and a second stream of packets to a second traffic mapper based on a destination of the packets in the second packet stream, the first and second streams being electrical signals;

producing, by the first mapper, a first stream of electrical signals from the first packet stream;

producing, by the second mapper, a second stream of electrical signals from the second packet stream, the second stream of electrical signals being separate from the first stream of electrical signals;

allocating bandwidth of an optical interface to each of the first and second streams of electrical signals, each mapper including at least one of Link Capacity Adjustment Schemes (LCAS) and Virtual Concatenation (VCAT) technologies for dynamically controlling the bandwidth allocated by the optical interface; and producing an optical signal that includes the first and second streams of electrical signals in accordance with the bandwidth allocated to each of the first and second streams of electrical signals.

21. The method of claim 20, further comprising responding by the optical network element to an address resolution protocol request on behalf of a node in a packet-switched network.

22. The method of claim 20, further comprising caching media access control (MAC) addresses and Internet Protocol (IP) addresses at the optical network element.

23. The method of claim 20, further comprising statically determining the bandwidth of the optical interface allocated to each stream of electrical signals.

24. The method of claim 20, further comprising dynamically controlling the bandwidth of the optical interface allocated to each stream of electrical signals.

25. The method of claim 20, wherein mapping includes applying Generic Framing Procedure (GFP).

26. The network element of claim 1, wherein the plurality of mappers, the network interface, and the optical interface are integrated in a single integrated circuit device.

27. The method of claim 20, wherein the allocating of bandwidth is in accordance with a Link Capacity Adjustment Scheme (LCAS).

28. The method of claim 20, further comprising determining to which of the mappers to forward a packet based on a virtual local area network (VLAN) tag in the packet.

29. The method of claim 20, further comprising determining to which of the mappers to forward a packet based on a multi-protocol label-switching (MPLS) label in the packet.

30. The method of claim 20, further comprising determining to which of the mappers to forward a packet based on an Internet Protocol (IP) address in the packet.

* * * * *